United States Patent [19]

O'Hara

[11] 3,909,396

[45] Sept. 30, 1975

[54] DESULFURIZATION PROCESS START-UP METHOD

[75] Inventor: Mark J. O'Hara, Mount Prospect, Ill.

[73] Assignee: Universal Oil Products Company, Des Plaines, Ill.

[22] Filed: Oct. 20, 1972

[21] Appl. No.: 299,477

[52] U.S. Cl. ................. 208/213; 208/216; 208/217
[51] Int. Cl.² ......................................... C10G 23/02
[58] Field of Search .................... 208/213, 216, 217

[56] References Cited
UNITED STATES PATENTS

| | | | |
|---|---|---|---|
| 2,776,245 | 1/1957 | Sowerwine | 208/217 |
| 3,122,495 | 2/1964 | Rosenblatt et al. | 208/216 |
| 3,519,573 | 7/1970 | Coe | 208/216 |

*Primary Examiner*—Delbert E. Gantz
*Assistant Examiner*—C. E. Spresser
*Attorney, Agent, or Firm*—James R. Hoatson, Jr.; Robert W. Erickson; William H. Page, II

[57] ABSTRACT

Adsorbed water exhibits a deactivating effect upon catalytic composites utilized for the hydrogenative desulfurization of hydrocarbonaceous charge stocks. Such composites, generally comprising an alumina-silica carrier material are dried, prior to contacting the charge stock, via a method which does not of itself induce deleterious effects respecting either catalyst activity, or stability. Drying is effected in a non-reducing atmosphere at static conditions.

5 Claims, No Drawings

DESULFURIZATION PROCESS START-UP METHOD

APPLICABILITY OF INVENTION

The invention herein described affords an improved method directed toward the start-up of a hydrogenative desulfurization process, and is especially adaptable for those processes which effect the desulfurization of asphaltene-containing hydrocarbonaceous black oils. Desulfurization, often included in the more broad term "hydrorefining," is conducted at conditions which result in the conversion of sulfurous compounds into hydrogen sulfide and hydrocarbons. The process is generally effected by reacting the charge stock with hydrogen in contact with a fixed-bed of a catalytic composite comprising a porous carrier material and one or more catalytically active metallic components. Porous carrier materials are selected from a wide variety of substances, but usually include, or are limited to refractory inorganic oxides, either amorphous, or zeolitic in nature. When of the amorphous type, the prior art indicates a preference for a carrier of alumina and from about 10.0 to about 90.0 percent by weight of silica. Zeolites, as is well known, are crystalline aluminosilicates comprising alumina and silica tetrahedra linked together to form three-dimensional cages having uniform pore openings.

Desulfurization processes are effected in contact with a catalyst containing one or more dual-function metallic components generally selected from Groups V-B, VI-B and VIII of the Periodic Table. Dual-function components are employed since the catalyst, to be acceptably effective, must necessarily possess both hydrogenation and cracking activity. In addition to the destructive removal of sulfurous compounds, such catalytic composites are intended to convert nitrogenous compounds into ammonia and hydrocarbons, and, in the case of black oils, to effect the conversion of asphaltenic molecules into lower-boiling hydrocarbons. These catalytic composites have the tendency to adsorb water from the atmosphere during the time lapse between manufacturing and use. When the catalyst contains more than 2.0 percent by weight of adsorbed water, it suffers early deactivation when contacted by the charge stock and hydrogen. This deleterious effect is noticeable regardless of the precise boiling range of the charge stock, but appears to be most prevalent with respect to asphaltene-containing black oils.

Therefore, while the present improved process start-up method is applicable to those desulfurization processes designed to hydrotreat naphthas, kerosines, light and heavy gas oils, and vacuum gas oils, it is most advantageous when utilized in a process wherein the charge stock is a hydrocarbonaceous black oil. A black oil is characterized by the inclusion of excessive amounts of nitrogenous compounds and sulfurous compounds, the latter commonly exceeding 2.0 percent by weight (as elemental sulfur). Additionally, a black oil contains asphaltic material which consists of high molecular weight, non-distillable coke-precursors complexed with sulfur, oxygen, nitrogen and various metal contaminants. Illustrative of such hydrocarbonaceous black oils is a crude tower bottoms product having a gravity of about 14.3°API, and containing 3.0 percent by weight of sulfur, 3.830 ppm. by weight of nitrogen, about 11.0 percent by weight of asphaltenes and 185 ppm. by weight of metallic contaminants.

OBJECTS AND EMBODIMENTS

A principal object of my invention is to afford a method for the start-up of a process designed to effect the desulfurization of a hydrocarbonaceous charge stock. A corollary objective is to provide a method for avoiding initial catalyst deactivation stemming from the presence of adsorbed water.

Another object is to effect the removal of adsorbed water from a desulfurization catalytic composite in a manner which, of itself, does not induce adverse effects with respect to catalyst activity and/or stability.

Therefore, in one embodiment, the present invention constitutes an improvement in a process for the desulfurization of a hydrocarbonaceous charge stock utilizing a catalytic composite comprising a carrier material of alumina and silica, which catalytic composite experiences deactivation as a result of adsorbed water therein, which improvement is a start-up method which comprises drying said catalytic composite, in a non-reducing atmosphere, under static conditions including a temperature above about 100°C., prior to contacting the composite with said charge stock.

Other objects and embodiments of my invention reside in the use of particular drying conditions and techniques. In one such other embodiment, the static conditions include a temperature in the range of 200°C. to about 600°C., and the adsorbed water content is reduced to a level below about 2.0 percent by weight. Preferably, the adsorbed water content is reduced to a level below about 0.5 percent by weight prior to contacting the catalyst with the charge stock.

PRIOR ART

Desulfurization processes are well known and thoroughly described in the literature, as are a wide spectrum of catalytic composites and methods for their manufacture. Both commercial experience and research results indicate a preference for a catalyst which utilizes a carrier material of alumina and silica, with and without other principally refractory material such as zirconia, strontia, boron phosphate, hafnia, etc. Preferred catalytically active, dual-function metallic components are those from Groups V-B, VI-B and VIII of the Periodic Table, and include, therefore, vanadium, chromium, niobium, molybdenum, tantalum, tungsten, iron, ruthenium, osmium, cobalt, rhodium, iridium, palladium, nickel, platinum and various mixtures thereof. Likewise, the prior art is replete with a myriad of techniques relevant to the manufacture of desulfurization catalytic composites. Such schemes vary principally in the selected method for combining the ingredients of the catalyst and in the final treatment after the components are combined.

Illustrative of catalyst manufacturing techniques is that which commences with the preparation of the porous carrier material — e.g. co-precipitation of an alumina hydrosol and water glass (sodium silicate). Following the recovery of the resulting alumina/silica precipitate and formation thereof into the desired size and shape, the carrier is dried and subjected to a high-temperature calcination, or oxidation technique. The active metallic components are incorporated within the preformed carrier by way of ion-exchange, generally in the case of zeolitic material, or by an impregnation technique utilizing water-soluble compounds of the selected metallic components — e.g. nickel nitrate hexahydrate and molybdic acid. After the metallic components have been combined, the composite is dried at a temperature of from 200°F. to about 400°F. and subsequently calcined, in an oxygen-containing atmosphere at elevated temperatures from 800°F. to about 1200°F. There is some evidence in the prior art that indicates advantages when the calcined catalyst is both pre-reduced and presulfided prior to use. The latter techniques are also generally effected at some elevated temperature. As hereinbefore stated, these desulfurization catalysts tend to adsorb water from the time of their manufacture to the time when they are disposed in the reaction chamber.

Prior to the introduction of the hydrocarbonaceous charge stock, the catalytic composite is contacted with a flowing stream of a hydrogen-rich gas while the temperature is being increased to the desired operating level. Although this technique may effect the removal of adsorbed water, there is induced a detrimental effect, the precise character of which is not known with accuracy. In any event, as hereinafter indicated by specific examples, the present start-up method, by which the adsorbed water is removed, has no adverse effect and results in the most active catalyst.

SUMMARY OF INVENTION

Briefly, the start-up method herein described involves adsorbed water removal prior to the time the catalyst is contacted either with hydrogen, or with the hydrocarbonaceous charge stock intended for desulfurization. The water content must be reduced to a level below about 2.0 percent by weight, and more preferably to a level from zero to about 0.5 percent by weight. Furthermore, the drying should be effected in a non-reducing atmosphere such as air, oxygen, nitrogen, carbon dioxide, etc. Static conditions, including a temperature above about 100°C. — i.e. 200°C. to about 600°C. — are utilized. Superatmospheric pressure may be employed; however, the ease of the start-up method is facilitated at atmospheric pressure. In the present specification and appended claims, the term "static conditions" is intended to connote that there is no forced flow of vaporous material through the bed of catalyst. Thus, in accordance with the present invention, the catalyst is simply heated to the desired temperature which is maintained for a period of from one to about 20 hours, until the water content is below about 2.0 percent by weight.

EXAMPLES

The examples which follow are presented for the sole purpose of illustrating the start-up method which forms the basis of the present invention, and are not intended to be limiting upon the inventive concept, the scope and spirit of which is defined by the claims appended hereto.

The hydrocarbonaceous charge stock employed throughout was a vacuum tower bottoms product. Analyses performed on the charge stock and the 75.0 percent so-called Engler bottoms (obtained via a vacuum Engler 100-ml. distillation), indicated that the former contained 4.7 percent by weight of heptane-insolubles, 3.2 percent by weight of sulfur and 10.40 percent hydrogen; the latter indicated a gravity of 6.0°API, 3.8 percent sulfur and 10.0 percent hydrogen. The charge stock, in each instance, was charged downflow over 150 cc. of catalyst with 15,000 scf./Bbl. of hydrogen. The pressure was maintained at 3,000 psig. and the temperature at the inlet to the catalyst bed at about 380°C.; the maximum catalyst bed temperature was controlled at about 425°C. Two liquid hourly space velocities were employed, 0.5 and 1.0, being the volumes of liquid hydrocarbon charged per hour, per volume of catalyst disposed in the reaction chamber.

EXAMPLE I

A catalyst was prepared via impregnation of a carrier (1/16-inch spheres) of 88.0% alumina and 12.0% silica, to contain about 2.0 percent by weight of nickel and 16.0 percent by weight of molybdenum. Catalyst "A," containing almost 3.0% adsorbed water, was charged directly to the reaction zone and heated in hydrogen, 14.0 cubic feet/minute, for 2 hours at a temperature of 260°C. At an LHSV of 1.0, the total liquid product indicated 1.22% heptane-insolubles, 0.34% sulfur and 11.87% hydrogen; the Engler bottoms had a gravity of 10.0°API, 10.60% hydrogen and 1.07% sulfur. At an LHSV of 0.5, the liquid product indicated 0.39% insolubles, 0.09 percent by weight of sulfur and 12.32% hydrogen.

A second portion of the same catalyst, referred to as catalyst "B," was heated for one-half hour at 500°C. under static conditions including atmospheric pressure. At an LHSV of 1.0, the total liquid product indicated 0.92% insolubles, 0.25 sulfur and 12.02% hydrogen, while the Engler bottoms had a gravity of 15.5°API, 11.21% hydrogen and 0.75% sulfur. At an LHSV of 0.5, the total liquid product contained 0.24% insolubles, 0.06% sulfur and 12.44% hydrogen; the Engler bottoms contained 11.87% hydrogen, 0.23% sulfur, and had a gravity of 21.3°API.

EXAMPLE II

In this example, the carrier was 10–30 mesh granular, and comprised a carrier material of 68.0% alumina, 10.0% silica and 22.0% by weight of boron phosphate. It was impregnated to contain 2.0 percent by weight of nickel and 16.0 percent by weight of molybdenum. Catalyst "C" was heated in flowing air (one cubic foot per hour) at 590°C. for 3 hours; the water content was reduced to less than 0.5 percent by weight. At an LHSV of 1.0, the total liquid product contained 0.63% insolubles, 0.35% sulfur and 11.79% hydrogen, while the Engler bottoms had a gravity of 5.3°API, and contained 0.66% sulfur. At an LHSV of 0.5, the liquid product contained 0.31% insolubles, 0.14% sulfur and 12.14% hydrogen; the Engler bottoms had a gravity of 8.6°API and contained 0.22% sulfur.

A second portion of the same granular catalyst, herein designated as catalyst "D," was heated for three hours at 590°C. under static conditions; the water content was again reduced to less than 0.5 percent by weight. At an LHSV of 1.0, the total liquid product indicated 0.52% insolubles, 0.27% sulfur and 11.84% hydrogen, while the Engler bottoms had a gravity of 11.0°API and contained 0.51% sulfur. At an LHSV of 0.5, the distillable product contained 0.25% insolubles, 0.11% sulfur and 12.20% hydrogen; the Engler bottoms had a gravity of 16.5°API and contained 0.20% sulfur.

These results clearly indicate the benefits afforded through the utilization of the present invention. The catalyst is significantly improved for heptane-insoluble conversion, desulfurization and hydrogenation; further, the quality of the vacuum Engler bottoms is improved with respect to gravity, and sulfur and hydrogen concentrations.

I claim as my invention:

1. In a process for the hydrodesulfurization of a hydrocarbonaceous charge stock utilizing a catalytic composite comprising one or more metallic components selected from the group consisting of Group V-B, Group VI-B and Group VIII of the Periodic Table and a carrier material of alumina and silica, which catalytic composite experiences deactivation as a result of adsorbed water therein, the improved method of start-up which comprises drying said catalytic composite, in a non-reducing atmosphere, under static conditions including a temperature above 100°C. and without forced flow of vaporous material through the composite, prior to contacting the composite with said charge stock.

2. The start-up method of claim 1 further characterized in that said temperature is in the range of about 200°C. to about 600°C.

3. The start-up method of claim 1 further characterized in that the adsorbed water content of said catalytic composite is reduced to a level below about 2.0 percent by weight.

4. The start-up method of claim 3 further characterized in that said adsorbed water content is reduced to a level of from zero to about 0.5 percent by weight.

5. The process of claim 1 further characterized in that said charge stock is an asphaltene-containing black oil.

* * * * *